Oct. 25, 1955   I. S. BOYDSTUN   2,721,928
HEATING APPARATUS
Filed Jan. 28, 1952   2 Sheets-Sheet 1
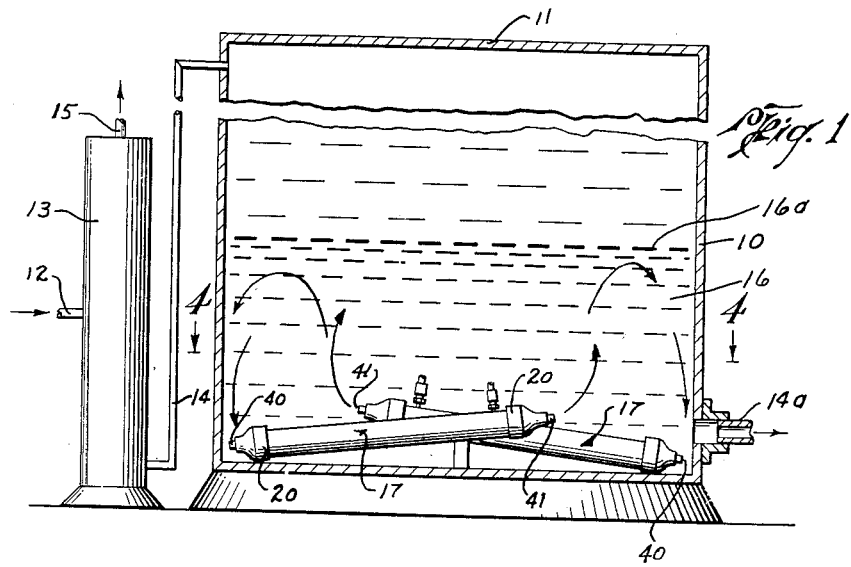
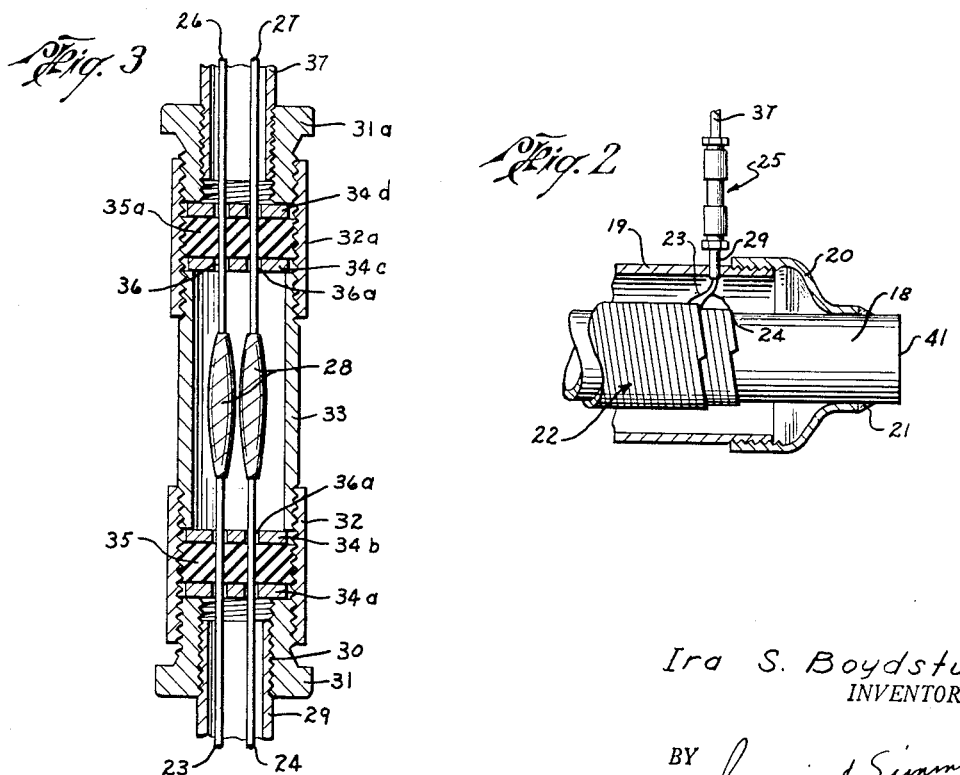
Ira S. Boydstun
INVENTOR.
BY Browning & Simms
ATTORNEYS Oct. 25, 1955     I. S. BOYDSTUN     2,721,928
HEATING APPARATUS
Filed Jan. 28, 1952     2 Sheets-Sheet 2
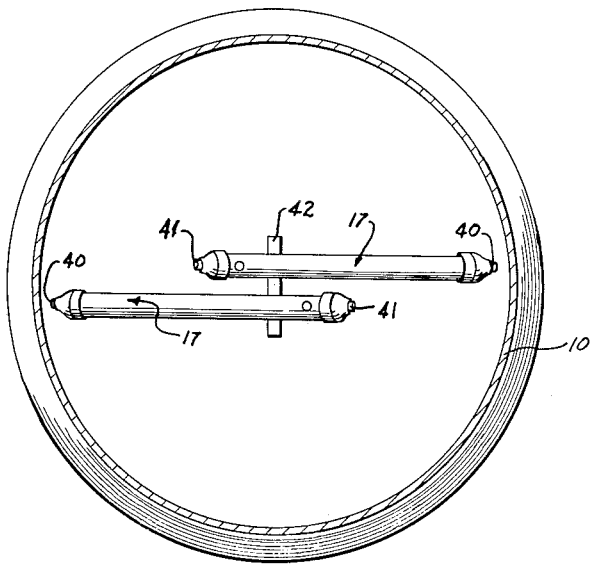
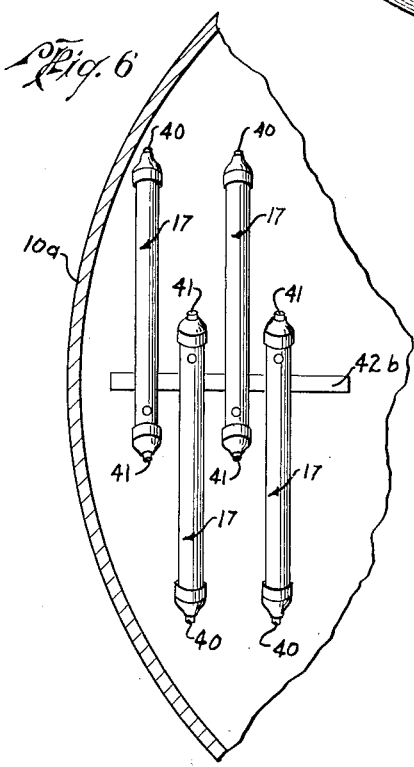
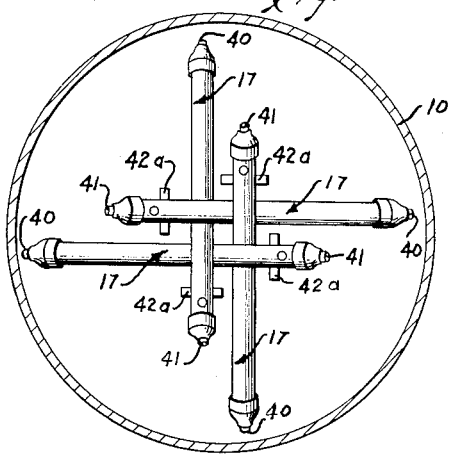
Ira S. Boydstun
INVENTOR.
BY
ATTORNEYS

United States Patent Office 2,721,928
Patented Oct. 25, 1955

2,721,928

HEATING APPARATUS

Ira S. Boydstun, Houston, Tex.

Application January 28, 1952, Serial No. 268,646

11 Claims. (Cl. 219—38)

This invention relates to apparatus for heating fluids within a receptacle such as a storage tank.

Crude oil, as it is produced from the earth, often contains high boiling point materials such as waxes, asphalts and the like which originally are in solution in the crude oil but which precipitate from solution upon lowering of the temperature of the crude oil mixture. In some crude oils, lowering of the temperature thereof a few degrees or even a single degree will cause a quantity of such high boiling point materials to precipitate as solid or semi-solid substances. Under sufficiently quiescent conditions, such as exist in storage tanks, these solid or semi-solid precipitates will settle from the crude oil mixture as sedimentary deposits in the bottom of the tank. These deposits must be periodically removed from the storage tank because they not only decrease the available storage volume of the tank but eventually work into transfer lines where they may cause clogging and disruption of pumping service. The precipitates removed as tank sediments or sludge are not usually processed to remove valuable constituents therefrom due to the difficulty and expense of transporting them to a refinery site. As a result, these sediments or sludges are an economic waste.

In the period between the time when crude oil first flows from a well until it is refined, there almost invariably occurs at least one period of storage under relatively quiescent conditions in a storage tank. Thus, it is common practice to flow the production of an oil well into a storage tank or into batteries of tanks where it remains until the production can be measured or gauged and until the pipe line company is ready to receive the oil and transport it to a refinery. The same crude oil may be further stored, more or less temporarily, in tanks provided by the pipe line company during its transmission to a refinery. Also, the refiner receives the crude oil in storage tanks where it remains until gauged and refined.

In any of these tanks, as well as in the pipe lines or transfer lines therebetween, the temperature of the crude oil may decrease sufficiently to cause the above-mentioned higher boiling precipitaes to form when the atmosphere or earth in contact with the tank or pipe line is cooler than the precipitate-forming temperature of the particular crude oil. To prevent such precipitation, it is necessary to either heat the oil sufficiently to maintain its temperature above the precipitation point of the sludge-forming constituents thereof or to provide insulation for the tanks and pipe lines which prevent chilling of the oil. The latter is obviously unfeasible from an economic viewpoint. Heating of the crude oil has not been successful commercially with systems heretofore known for several reasons, mostly economic ones.

In preventing the precipitation of high boiling constituents from crude oil, it is desirable to maintain the temperature of the oil immediately above a rather definite minimum temperature which is dependent upon the particular characteristics of a specific crude oil. Raising the temperature of the oil greatly in excess of this minimum is undesirable for several reasons. First, it is not economical for a seller of crude oil to raise its temperature greatly and thus give his buyer the benefit of the heating without compensation. Secondly, crude oils comprise a wide boiling range mixture of hydrocarbons. Some of the constituents are dissolved normally gaseous hydrocarbons such as methane. Others are easily vaporized such as propane and butane. Hence an excessive increase in temperature of the crude oil causes these lower boiling constituents to vaporize and to raise the pressure within a tank. Since most storage tanks are designed to operate at low pressures approaching atmospheric, a higher pressure would result in escape of valuable hydrocarbons through relief valves installed to protect the tanks. Further, an elevated temperature and resultant increase in vapor pressure of a crude oil tends to cause trouble by gassing off transfer pumps and would necessitate expensive installations to prevent this.

In maintaining the temperature of a crude oil above a predetermined minimum, heat must be added at a comparatively low temperature input level. If a heating element is employed at an excessively high temperature to gain a high heat input rate per unit of heater area, then the heater is apt to become clogged with coke, carbon, or other materials. Hence, it is necessary to avoid not only a general overheating of a crude oil throughout a tank but also local overheating of the oil by a heater.

While much of the above discussion has been with regard to crude oils, it will be appreciated that the problem of maintaining a fluid above a minimum temperature or of heating the same while stored in a receptacle or tank is existent in other fields. For example, saturated solutions of materials must often be maintained above a certain minimum temperature to prevent crystallization of such materials from solution during storage. Also many materials, either in pure form or in solutions, must, for various reasons, have heat applied thereto while in a tank and the apparatus of this invention has utility in these and a variety of other circumstances.

An object of this invention is to provide apparatus adapted to heat a fluid within a receptacle such as a tank, which apparatus is relatively simple to install and use, has a high safety factor and can economically heat a body of fluid to maintain or raise the latter's temperature in a uniform manner without causing any general or local excessive overheating thereof.

Another object of this invention is to provide heating apparatus which is disposed in a receptacle in such a manner that thermal currents are promoted in the receptacle to prevent local overheating of the fluid by the heating apparatus or excessive local cooling of the fluid in the region of the wall of the receptacle.

Another object of this invention is to provide apparatus including a heater adapted to supply heat to a body of fluid much larger than the heater and yet maintain such body with a uniform temperature throughout.

Another object of this invention is to provide a heating apparatus wherein a heating conduit is arranged to thermally pump fluid and circulate the same throughout a tank thereby transferring heat throughout a large body of fluid from a small area of heat input.

Another object of this invention is to provide an apparatus for heating a fluid within a receptacle in such a manner that the fluid is continuously circulated in accordance with its temperature so that a cooler fluid is selectively heated in preference to a warmer fluid even though no mechanical separation of the cooler and warmer fluids is provided.

Other objects, advantages and features of this invention will be apparent to one skilled in the art upon a consideration of the written specification, the appended claims and the attached drawings wherein:

Fig. 1 is a side elevation, partly in section, showing the apparatus of this invention disposed in a storage tank;

Fig. 2 is an elevation, partly in cross-section, showing the construction of one end of the heating unit of this invention;

Fig. 3 is a sectional view showing one form of sealed connector for connecting a source of electrical energy to an electrical inductance coil which may be used in the heating unit of this invention;

Fig. 4 is a plan view taken on the line 4—4 of Fig. 1 and further illustrates the disposition of the heating units of the latter figure;

Fig. 5 is a view similar to Fig. 4 except that it illustrates another disposition of the heating units of this invention; and Fig. 6 is a partial horizontal cross-sectional view of a tank showing another manner of disposing the heating units.

Like characters of reference are used throughout the several views to designate like parts.

In general, the apparatus of this invention includes a conduit having an inlet and outlet and a heating means associated with the conduit for heating fluid passing through the latter from the inlet to the outlet. The inlet of the conduit is arranged at a lower level or elevation than the outlet so that fluid heated within the conduit may be thermally elevated therein to cause flow through the conduit. In a preferred form, a plurality of such heating units are employed and are arranged among themselves so that heated fluid discharged from the outlet from any conduit is free to flow upwardly without substantially interfering with the flow of cooler fluid to the inlet of the conduit. With such an arrangement, the heated fluid is free to rise within the body of somewhat cooler fluid contained in a receptacle, the heated fluid having a lower specific gravity than that of the cooler fluid immediately surrounding the same due to the difference in temperature. Even though the heated fluid undergoes heat exchange with the surrounding cooler fluid, it will continue to rise therein as long as its specific gravity is lower than that of the fluid surrounding it so that eventually it rises to the surface of the fluid within the receptacle or until it is surrounded by fluid having substantially the same specific gravity and temperature. As the fluid is cooled, its specific gravity increases and it seeks a lower level in the tank. When it has been cooled sufficiently to reach the level of the conduit inlet, it will flow through the conduit again and become heated. In this manner, thermally induced currents are set up in the receptacle to maintain the fluid therein at a substantially uniform temperature with a minimum of heat input, the cooler fluid being heated preferentially to a fluid having a temperature higher than that of the cooler fluid.

Referring now to the drawings, there is illustrated a receptacle in the form of a tank 10 which may have a closed top 11 and be fitted with various relief valves and the like well known to those skilled in the art. Fluid to be stored in a tank, as from a producing oil well, can be passed through a conduit 12 into a separator tank 13. In the latter, liquids are separated from gases, the liquids being pumped or pressured through conduit 14 into tank 10. The separated gases pass out through conduit 15. The liquid from conduit 14 falls into tank 10 having a body of fluid 16 therein with a level 16a. A liquid outlet 14a is provided in one side of tank 10. Disposed within tank 10 are heating units 17 arranged in a manner more fully described hereinafter.

Heating units 17 comprise a conduit 18 having a spaced apart inlet and outlet. As shown in the drawings, the inlet and outlet can be the open ends of conduit 18.

Disposed around conduit 18 is a jacket comprising a tube 19 spaced from conduit 18 and substantially coaxial therewith. The ends of the tube are sealed to conduit 18 by means of cap 20 screwed to the tubing and connected to the conduit as by weld 21. It will be understood that both ends of tube 19 are sealed to conduit 18 by the caps in the manner detailed in Fig. 2 for a single end. The jacket for conduit 18 along with electrical inductance coil 22 comprises a heating means adapted to heat fluid flowing through conduit 18.

Inductance coil 22 is preferably wound in one of the manners disclosed in copending application Serial No. 265,342 filed January 7, 1952, by Greig C. Douglas, Cordell Wagner and Ira S. Boydstun. Such type of winding is particularly applicable in those instances where a polyphase current is to be utilized for heating. The current source can be an ordinary 60 cycle per second current at voltages of 110 to 440 or higher. In general, each coil comprises a plurality of layers of windings, one on top of the other, the windings of the several layers being in series in the same rotative direction so as to give positive mutual inductance between the layers of the coil. The coils, one for each phase of the current, can be, for three-phase currents, connected in delta, Y, or open delta. For a further disclosure of the specific details of these coils, reference is made to the above-mentioned copending application. It is also contemplated that coil 22 can be wound in a conventional manner for a single-phase current. For any type of coil, it is preferably wound by using fibrous glass insulating material and a thermosetting silicone resin varnish, all as disclosed in said copending application.

If a single-phase coil is employed, it will be necessary to provide two conductors through tube 19 to a source of electrical energy. These conductors are illustrated as 23 and 24 in Fig. 2 and pass into a connecting means designated generally by the numeral 25 and shown in cross-sectional detail in Fig. 3. As shown in Fig. 3, wires 23 and 24 are spliced to wires 26 and 27, respectively, by means of a conventional splice wrapping 28. Wires 23 and 24 are conducted from the interior of tube 19 by a conduit 29 adapted to be fastened as by welding to casing 19 and having its outer end threaded at 30. Screwed to this conduit is a bushing 31 bearing a coupling 32 on its outer threads. A nipple 33 joins coupling 32 to a similar coupling 32a and a bushing 31a. Disposed within couplings 32 and 32a and between nipple 33 and bushings 31 and 31a, respectively, are pairs of endwise facing washers 34a through 34d. Washers 34a and 34d are adapted to abut against the inner ends of bushings 31 and 31a, respectively, while washers 34b and 34c are adapted to abut against the end of nipple 33. Disposed between each pair of washers are rubber sealing elements 35 and 35a. The washers and sealing elements have centrally disposed openings 36 and 36a therethrough for wires 23 and 26 and wires 24 and 27, respectively.

In using this connector, wires 23 and 24 can be extended through washers 34a and 34b and rubber sealing element 35 to extend thereabove. In a similar manner, wires 26 and 27 can be passed through washers 34c and 34d and rubber sealing element 35a, it being understood that couplings 32 and 32a have not as yet been joined together by nipple 33. After the wires have been inserted through these sealing elements, splices 28 can be made between their respective ends after which nipple 33 is screwed into coupling 32 to bear against washer 34b and thereby cause rubber sealing element 35 to expand laterally, and during such expansion, to decrease the size of the openings therethrough and become wedged in fluid tight relationship around wires 23 and 24 and against the threads of coupling 32. After this has been done, coupling 32a can be made up on nipple 33 and bushing 31a tightened to expand sealing member 35a laterally and form a fluid tight seal with wires 26 and 27 and the threads of coupling 32a.

It will be apparent from this discussion that the connector of Fig. 3 not only prevents flow of fluid inwardly of tube 19 but also provides a fluid tight chamber formed by a conduit having its ends sealed between two expansible elastic sealing elements, the chamber being adapted to contain splices between one or more wires extending through the sealing elements.

If desired, a conduit 37 can be connected to bushing 31a and extend above the liquid surface in the tank or entirely out of the tank to form a fluid tight conductor for wires 26 and 27. It is contemplated that wires 26 and 27 can be protected other than by conduit 37 as by a fluid tight flexible covering therearound.

Other types of connecting means can be employed particularly those types disclosed in the above-identified copending application. Reference is made to this copending application for a complete disclosure of other types of connecting means. It should be noted that when three-phase current is employed, three wires can be spliced in connector 25 by merely providing a third hole in the washers and sealing elements.

In accordance with this invention, heating units 17, including conduit 18, are positioned in the tank so that the inlet to the conduit is in the lower portion of the receptacle and at an elevation lower than that of the conduit outlet. When so arranged, fluid from the lower portion of the receptacle is free to enter the conduit inlet and to become heated within the conduit by the action of inductance coil 22. Such heating causes a lessening of the specific gravity of the fluid so that it tends to rise and hence passes along the conduit to the conduit outlet from whence it is discharged. In this manner, cooler fluid is taken into the conduit and heated while passing therethrough and, after being heated, is discharged from the conduit outlet at a position spaced from the inlet so that it is free to rise from the outlet without substantially interfering with the cooler fluid flowing directly toward the conduit inlet. When using a plurality of heating units, they are disposed in accordance with this invention in the same manner as just discussed with reference to a single conduit and also so that the inlet of any one conduit is spaced from the outlet of any other conduit to permit fluid heated in one conduit to rise freely from the outlet thereof without substantially interfering with cooler fluid passing directly toward the inlet of any other conduit. In its most preferred form, the heating units of this invention are arranged so that their outlets are in a common zone. With such a common zone arrangement, the heated fluid from all of the conduits, or a portion of them, is free to rise through said zone as a combined upwardly flowing body of liquid. Illustrative arrangements of heating units in accordance with the foregoing concept are shown in Figs. 4, 5 and 6.

Referring now to Figs. 1 and 4, there is illustrated the disposition of a pair of conduits which is particularly adapted for supplying heat to a fluid within a rather small receptacle wherein the length of each conduit is somewhat greater than the radius of the receptacle. In such an arrangement, the end of the heating units adjacent the conduit inlets 40 rest on the bottom of the receptacle and adjacent its outer walls. The conduit outlets 41 are elevated above the conduit inlets 40 by positioning the heating units upon a means for supporting the same. As illustrated, this means comprises simply a member or block 42 upon which the heating units rest adjacent the outlet end of the conduits.

With the arrangement of Figs. 1 and 4, fluid adjacent the walls of receptacle 10 is free to enter conduit inlets 40 and to be heated by the action of induction heating coils 22 contained in each of the heating units. As the fluid is heated, its specific gravity decreases causing it to tend to rise and hence pass along the length of the conduit towards the outlet openings 41 from which it is discharged. The discharged and heated fluid has been heated sufficiently in the heating units so that its specific gravity is lower than that of the main body of fluid immediately surrounding the outlets 41. As a result, the heated fluid rises in the body of fluid within receptacle 10 toward the surface 16. As it rises, there occurs a transfer of heat from the heated fluid to the body of fluid surrounding the same, such transfer being both by conduction and by intermixing of the heated fluid with the cooler fluid. Accordingly, the particular fluid which has been heated in the heating units tends to decrease in temperature and assume a temperature approaching that of the surrounding main body of fluid within the receptacle. As it does so, its specific gravity likewise approaches that of the main body of fluid and its rate of rise decreases proportionally to its change in specific gravity.

While this interchange of heat occurs between the heated fluid and the body of fluid immediately surrounding the same, the fluid within receptacle 10 immediately adjacent the walls thereof becomes cooled by heat exchange with the atmosphere surrounding the tank when temperature conditions are favorable for this. As a result, the fluid immediately adjacent the walls of the tank becomes cooled with a resultant increase in specific gravity so that it tends to settle towards the bottom of the tank and displace the lighter and warmer fluid to the top of the tank. As the cooler fluid approaches the bottom of the receptacle, it also approaches conduit inlets 40 and is free to be drawn into the heating units to complete a cycle of thermo-pumping action of the units.

From the foregoing, it will be apparent that the apparatus illustrated in Figs. 1 and 4 will cause a general circulation of fluids within a receptacle. This circulation, generally, comprises the raising of fluids in an area containing the conduit outlets 41 of the heating units and a downward flow of fluids in an area laterally remote from the rising fluids and generally in an area coincident with the conduit inlets 40. It will also be apparent that the thermo-pumping action of the heating units as arranged as in Figs. 1 and 4 is not in opposition to the thermally created flows normally occurring due to cooling of the fluids at the receptacle walls.

Thus, in a receptacle such as illustrated in Fig. 1, wherein no heat is added to the fluid contained therein, the fluid adjacent the outer walls of the receptacle normally tends to be cooled and to settle towards the bottom of the tank. Such settling would tend to displace fluid from the bottom of the receptacle inwardly towards a central area thereof where the fluid is of lighter gravity and hence would create an upward moving column of fluid centrally of the receptacle. Disposition of heating units 17 within the receptacle as illustrated in Figs. 1 and 4 materially assists and increases this normal flow of fluid so that a maximum volume of fluid within the tank can come within contact with the heating units in any given period of time. As a result, the temperature of the fluid passing through the heating units can be raised a minimum amount, thereby requiring a minimum amount of energy to insure that the over-all temperature of the fluid within the receptacle does not fall below the desired minimum. Also, with such an arrangement, the warmest fluid within the receptacle is situated centrally thereof where there obtains the least transfer of heat to the atmosphere surrounding the receptacle. The coolest fluids within the receptacle, on the other hand, are situated adjacent the walls and provide a minimum temperature differential between the fluid and the surrounding atmosphere so as to maintain a minimum transfer of heat to the atmosphere.

Referring now to Fig. 5, there is illustrated another arrangement of heating units 17 similar to that of Fig. 4 except that two pairs of heating units are arranged to heat fluid taken from points adjacent the outer periphery of the receptacle 10 but spaced apart substantially 90°. Each of the heating units has its conduit outlet 41 elevated above its conduit inlet 40 by resting the heating unit adjacent the outlet end of the conduit on a supporting means such as blocks 42a. In this arrangement, it will be noted that any given heating unit extends laterally of another pair of units and extends under the one of such pair closest to its own inlet end 40 and over the other one of such pair most removed from its inlet 40. In this manner, the heating units are arranged in criss-cross, interwoven fashion to thereby permit their outlets 41 to be in substantially the same horizontal plane.

The operation of the apparatus as illustrated in Fig. 5 is substantially similar to that of Fig. 4 except that the cooler fluid to be heated is drawn into the heating units at points spaced around the periphery of the receptacle, e. g. 90° apart. Nevertheless, the heated fluid is discharged from outlets 41 in a common zone and is free to rise toward the upper surface of the fluid contained in receptacle 10 without substantially interfering with the cooler fluid flowing downwardly adjacent the walls of the receptacle. The common zone of discharge of outlets 41, in this instance, will have its periphery spaced outwardly of the outlets 41 towards the wall of receptacle 10 but intermediate of the most adjacent outlets and inlets of any given parallel pair of heating units. Heated fluid discharged from outlets 41 will rise within this common area and as it transfers heat to fluid within the receptacle, the density of the heated fluid will approach that of the fluid adjacent thereto causing the rate of rise to decrease. Finally the heated fluid will flow laterally outward from the center of the tank towards the wall thereof where it can be subjected to cooling by the atmosphere surrounding the receptacle thereby causing it to settle in the receptacle toward the bottom thereof and again be heated by passage through the heating units.

The arrangement of heating units in Fig. 6 is particularly adapted for use in a large receptacle whose diameter is considerably larger than the length of a heating unit. Thus, the heating units and the conduits contained therein are arranged in groups with each group of conduits having their outlets disposed in a separate common zone from any other group and each of the separate common zones being spaced from the inlet of any conduit. In this arrangement, heating units 17 are again arranged with their conduit inlets 40 at an elevation lower than the conduit outlets 41 and rest upon a support 42b adapted to effect such difference in elevation. Outlets 41 all discharge in a common zone so that heated fluid is free to rise within the receptacle without substantial interference with cooler fluid passing directly toward inlets 40. As shown in Fig. 6 the heating units extend alternately to either side of support 42b so that a group of the heating units have their conduit inlets 40 disposed to one side of the common discharge zone of the outlets and the remaining heating units have their conduit inlets disposed to the other side of such common zone. It is contemplated that a plurality of groups of heating units as illustrated in Fig. 6 can be disposed about the periphery of receptacle 10a to effect the desired degree of heating of the fluid contained within the receptacle.

Due to the much larger volume of a large tank, the peripheral arrangement of Fig. 6 is satisfactory. With such arrangement, the volume of fluid in the central portion of the receptacle is large and need not be disturbed by the thermal currents created by the heater units, the latter serving to prevent the fluid adjacent the receptacle walls from becoming too cool. In other words, the large volume of the receptacle permits the confinement of the thermal currents to a peripheral area where the greatest amount of cooling occurs. It is to be understood, however, that some incidental flow of heated fluid may take place toward the central portion of receptacle 10a.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for heating a fluid within a receptacle which comprises, in combination, a plurality of conduits each having a fluid inlet and outlet, the inlets and outlets of the conduits being positioned in the lower portion of said receptacle with the inlets at a lower elevation than the outlets, the inlet of each of said conduits being spaced horizontally from the outlet of any of said conduits whereby a fluid heated in one conduit is free to rise from the outlet thereof without substantially interfering with fluid passing directly toward the inlet of any of said conduits, and heating means for each conduit adapted to heat fluid within the respective conduit.

2. The apparatus of claim 1 wherein said conduit outlets are disposed within a common zone and the conduit inlets are spaced horizontally from said zone.

3. The apparatus of claim 1 wherein said heating means comprises a fluid-tight jacket on each of said conduits and embracing at least a portion of the length thereof, and electrical induction heating means disposed between each jacket and its respective conduit.

4. An apparatus for heating a fluid within a receptacle which comprises, in combination, a plurality of conduits each having a fluid inlet and outlet, means supporting the conduits in a sloping position with their inlets at a lower elevation than the respective outlets, the inlets being in communication with the lower portion of the receptacle adjacent its periphery, said conduits being arranged in the receptacle with the inlet of each of said conduits spaced horizontally from the outlet of any of said conduits whereby fluid heated in one conduit is free to rise without substantial interference with fluid passing directly toward the inlet of another conduit, and heating means for each conduit adapted to heat fluid within the respective conduit.

5. The apparatus of claim 4 wherein the conduits are arranged with their outlets disposed in a common zone, a portion of the conduits having their inlets disposed beyond one side of said zone and another portion having their inlets disposed beyond an opposite side of said zone.

6. The apparatus of claim 5 wherein alternate conduits are disposed with their inlets beyond said one side and the remainder with their inlets beyond said opposite side.

7. The apparatus of claim 5 wherein said common zone is substantially centrally located of the horizontal cross-section of said receptacle.

8. The apparatus of claim 5 wherein said conduits are arranged in groups, each group of conduits having their outlets disposed in a separate common zone from any other group, each of said separate common zones being spaced from the inlet of any conduit.

9. The apparatus of claim 5 wherein said common zone is situated centrally of the receptacle and the conduits extend outwardly from said zone toward the periphery of said receptacle.

10. The apparatus of claim 9 wherein there is at least one pair of conduits extending past each other within said zone to space their respective outlets intermediate the ends of the other conduit of the pair.

11. An apparatus for heating a fluid within a receptacle which comprises, in combination, a plurality of heating units each comprising a conduit having an inlet spaced apart from an outlet, a fluid-tight jacket embracing a length of the conduit between the inlet and outlet thereof, electrical inductance heating means between the jacket and conduit; a support maintaining the outlet of each of said units above its respective inlet, the ends of the units near said inlets resting on the bottom of said receptacle; said units being arranged with their outlets in a common zone and their inlets spaced from said zone so that heated fluid is free to rise from the outlets within said zone without substantial interference with fluid flowing immediately toward the inlets.

References Cited in the file of this patent

UNITED STATES PATENTS

| | | |
|---|---|---|
| 942,894 | Farren et al. | Dec. 14, 1909 |
| 1,723,743 | Mason | Aug. 6, 1929 |
| 1,854,322 | White | Apr. 19, 1932 |
| 1,864,435 | Hebeler | June 21, 1932 |
| 2,146,402 | Morgan | Feb. 7, 1939 |
| 2,472,445 | Sprong | June 7, 1949 |
| 2,511,902 | Cabrera | June 20, 1950 |